(12) United States Patent
Wall

(10) Patent No.: US 10,076,940 B2
(45) Date of Patent: Sep. 18, 2018

(54) TRAILER SUSPENSION INCLUDING TUBES AND WIRES SUPPORT SYSTEM

(71) Applicant: Reyco Granning, LLC, Mount Vernon, MO (US)

(72) Inventor: Kenneth Wall, Springfield, MO (US)

(73) Assignee: REYCO GRANNING, LLC, Mount Vernon, MO (US)

( * ) Notice: Subject to any disclaimer, the term of this patent is extended or adjusted under 35 U.S.C. 154(b) by 467 days.

(21) Appl. No.: 14/948,507

(22) Filed: Nov. 23, 2015

(65) Prior Publication Data
US 2017/0144501 A1    May 25, 2017

(51) Int. Cl.
*B62D 53/06*    (2006.01)
*B60R 16/02*    (2006.01)
*B60G 11/28*    (2006.01)
*B60G 11/27*    (2006.01)

(52) U.S. Cl.
CPC .............. *B60G 11/28* (2013.01); *B60G 11/27* (2013.01); *B60R 16/0215* (2013.01); *B62D 53/068* (2013.01); *B60G 2204/126* (2013.01); *B60G 2204/20* (2013.01); *B60G 2204/202* (2013.01); *B60G 2204/43* (2013.01); *B60G 2300/042* (2013.01); *B60G 2300/40* (2013.01)

(58) Field of Classification Search
CPC ............ B60R 16/0215; B60R 16/0222; B62D 53/068; B60G 2204/202
USPC ............................ 280/149.2, 407.1; 180/209
See application file for complete search history.

(56) References Cited

U.S. PATENT DOCUMENTS

| | | | |
|---|---|---|---|
| 2,835,504 | A | 5/1958 | Acker |
| 3,851,672 | A | 12/1974 | De Vincent et al. |
| 4,993,737 | A | 2/1991 | Torcomian |
| D333,421 | S | 2/1993 | Patti |
| 5,232,234 | A | 8/1993 | McCombs |
| 5,346,233 | A | 9/1994 | Moser |
| 5,451,069 | A | 9/1995 | Schueman |
| 5,531,467 | A | 7/1996 | Schueman |
| 5,564,725 | A | 10/1996 | Brazeal |
| 6,213,489 | B1 | 4/2001 | Eckelberry |

(Continued)

FOREIGN PATENT DOCUMENTS

WO    WO-2016082848 A1 *    6/2016    ......... B60R 16/0215

*Primary Examiner* — Ruth Ilan
(74) *Attorney, Agent, or Firm* — Greer, Burns & Crain, Ltd.

(57) ABSTRACT

A trailer slider suspension including a tubes and wires support system. The slider includes a frame slideably coupled to and supporting a trailer. Axles are pivotally secured to the frame. Air springs are provided between the axles and stop plates on the frame. The air springs include bearing plates abutting the stop plates. The bearing plates include fasteners which extend through corresponding holes in the stop plates. Supporting brackets are secured to the frame with the bearing plates fasteners extending through corresponding securement holes in the brackets and nuts threadingly received thereon, thereby clamping the brackets between the nuts and stop plates. The brackets include support holes wherethrough the tubes and wires are received and supported. A main brace is secured between the stop plates and the frame and side braces are secured between the stop plates and the main brace. The brackets include walls or slots engaging the braces.

20 Claims, 9 Drawing Sheets

(56) References Cited

U.S. PATENT DOCUMENTS

| | | |
|---|---|---|
| 6,241,198 B1 * | 6/2001 | Maruyama .............. F16L 3/223 |
| | | 248/49 |
| 7,163,220 B2 | 1/2007 | Pappas |
| 7,261,177 B2 | 8/2007 | Eckelberry |
| 8,360,371 B2 | 1/2013 | Getts |
| 2004/0164576 A1 * | 8/2004 | Wright ................ B60R 16/0215 |
| | | 296/1.01 |
| 2016/0265566 A1 * | 9/2016 | Talley ....................... F16B 2/24 |
| 2017/0250528 A1 * | 8/2017 | Fujiki .................. H01B 7/0045 |
| 2017/0267191 A1 * | 9/2017 | Chambosse ......... B60R 16/0215 |

\* cited by examiner

US 10,076,940 B2

TRAILER SUSPENSION INCLUDING TUBES AND WIRES SUPPORT SYSTEM

1. Field of the Invention

The present invention relates to the field of trailer suspensions. More particularly, the present invention relates to slider trailer suspensions including a system for supporting air tubes and electrical conductor wires.

2. Background

Slider suspensions also known as "sliders" are today commonly used on trailers whereby the axles thereof can be longitudinally adjusted and then pinned to the trailer chassis relative to the load carried by the trailer. An exemplary slider is, for example, shown and described in U.S. Pat. No. 7,163,220. Such sliders include various air operated components including air brakes and suspension air springs, as well as electrical control sensors, etc. Hence air tubes and electrical wires must be strung through the slider frame to the various slider components and, if perhaps needed, also through the slider frame to lights and components at other locations of the trailer.

The tubes and wires are typically strung through holes in the frame beams and/or are otherwise secured to the slider frame, for example, as shown in U.S. Pat. Nos. 2,835,504 and 7,261,177. However, the prior means of securing the tubes and wires to the frame require that the tubes and wires follow the paths of the beam holes which may not be efficient and desirable, and the securements to the frame can over time become unreliable.

Accordingly, a system is needed for effectively and relatively inexpensively supporting tubes and wires extending through a slider suspension system along a desired or needed path regardless of the locations of the frame beams and the holes thereof.

SUMMARY

The present invention addresses and overcomes the shortcomings of prior slider suspensions.

In one form thereof the present invention is directed to a trailer suspension including a tubes and wires support system. The suspension includes a frame adapted to support a trailer. An axle is pivotally secured to the frame. A suspension air spring is located between the axle and a stop plate secured to the frame. The suspension air spring includes a bearing plate having a fastener extending therefrom. The air spring bearing plate abuts the stop plate with the fastener extending through a hole in the stop plate. A tubes and wires supporting bracket is secured to the frame with the fastener whereby tubes and wires extending along the frame are supported by the bracket. The frame is preferably slidably coupled to a trailer chassis and is selectively longitudinally slidable along the chassis.

Preferably, the supporting bracket includes one or more supporting holes wherethough the tubes and wires are received and are thereby supported. Annular grommets are provided circumscribing the bracket supporting holes wherethough the tubes and wires are received and are thereby supported.

Also preferably, a main brace is secured between the stop plate and the frame and a side brace is secured between the main brace and the stop plate, and the bracket includes a wall abutting the side brace. Alternatively, the bracket includes a slot and a portion of the side brace is received in the slot.

The bracket preferably includes a securement hole wherethrough the fastener extends and a bolt is threadingly received on the fastener whereby the bracket is clamped between the bolt and the stop plate.

In another embodiment, the bearing plate includes two fasteners extending therefrom and through separate holes in the stop plate, and the bracket is secured to the frame with both fasteners. The bracket preferably includes a pair of securement holes and a bridge therebetween and each of the two bearing plate fasteners extend through a respective one of the bracket securement holes.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein.

Figure 1:
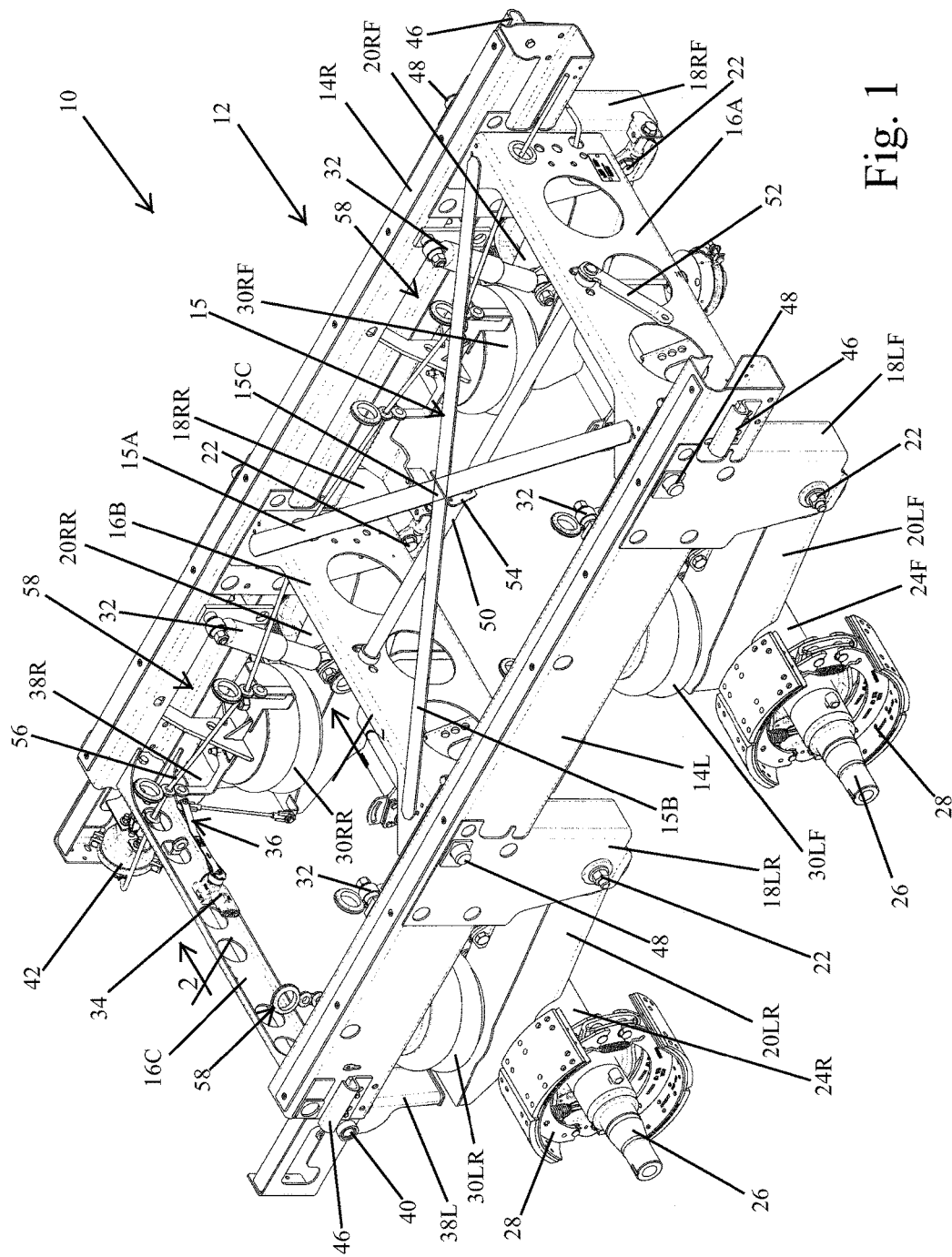
FIG. 1 is a perspective view of a slider suspension including a tubes and wires support system constructed in accordance with the principles of the present invention.

Corresponding reference characters indicate corresponding parts throughout several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

A slider constructed in accordance with the principles of the present invention is shown in FIG. 1 and is designated by the numeral 10. Slider 10 includes a frame 12 including left and right side longitudinal C-shaped rails 14L, 14R and cross beams 16A, 16B, 16C secured to and extending perpendicularly between the side rails 14L, 14R. A cross brace 15 is provided for resisting twisting of the frame 12. Cross brace 15 comprises straps 15A and 15B which cross at about their center 15C and form an "X". Strap 15A extends between and is secured to the terminal end of cross beam 16A adjacent side rail 14L and to the terminal end of cross beam 16B adjacent side rail 14R. Strap 15B extends between and is secured to the terminal end of cross beam 16A adjacent side rail 14R and to the terminal end of cross beam 16B adjacent side rail 14L. Straps 15A, 15B function in tension and so are typically made of relatively thin steel of about 0.179 inch thick and 0.50 to 2.0 inches wide.

Left front and rear hangers 18LF, 18LR are secured to and extend vertically below the left side rail 14L, and right front and rear hangers 18RF, 18RR are secured to and extend vertically below the right side rail 14R. A left front trailing beam 20LF is pivotally secured to the lower terminal end of left front hanger 18LF with a pivot bushing assembly 22; a left rear trailing beam 20LR is pivotally secured to the lower terminal end of left rear hanger 18LR with a pivot bushing assembly 22; a right front trailing beam 20RF is pivotally secured to the lower terminal end of right front hanger 18RF with a pivot bushing assembly 22; and, a right rear trailing beam 20RR is pivotally secured to the lower terminal end of right rear hanger 18RR with a pivot bushing assembly 22.

A front axle 24F extends between and is secured to each of the left front trailing beam 20LF and the right front trailing beam 20RF. A rear axle 24R extends between and is secured to each of the left rear trailing beam 20LR and the right rear trailing beam 20RR. The terminal ends of the axles 24F, 24R are provided with spindles 26, in a known and customary manner, which are adapted to rotatably carry wheels (not shown). The terminal ends of axles 24F, 24R are also provided with brake assemblies 28, in a known and customary manner, which are adapted to be actuated with air activated spring brake chambers (not shown) in the rotatable wheels.

A left front air spring 30LF is provided between and is secured to the left front trailing beam 20LF and the left side rail 14L; a left rear air spring 30LR is provided between and is secured to the left rear trailing beam 20LR and the left side rail 14L; a right front air spring 30RF is provided between and is secured to the right front trailing beam 20RF and the right side rail 14R; and, a right rear air spring 30RR is provided between and is secured to the right rear trailing beam 20RR and the right side rail 14R. A shock absorber/dampener 32 is pivotally secured between each of the left front and left rear trailing beams 20LF, 20LR and the left side rail 14L. A shock absorber/dampener 32 is also pivotally secured between each of the right front and right rear trailing beams 20RF, 20RR and the right side rail 14R. As should now be appreciated, the axles 24F, 24R are pivotally moveable vertically about pivot bushing assemblies 22, and the load from the axles 24F, 24R is transferred to the frame 12 through the air spring 30LF, 30LR. 30RF, 30RR which are in compression.

Pressurized air is provided to each of the air springs 30LF, 30LR, 30RF, 30RR from an air pressure source (not shown) through a height control valve 34. Height control valve 34 is mounted on cross beam 16C of the frame 12 and is coupled to trailing beam 20RR with a linkage 36 whereby the distance between trailing beam 20RR and the frame 12 is monitored and is used for pressurizing the air springs 30LF, 30LR, 30RF, 30RR as needed for provided a desired spring rate and for adjusting the height of frame 12 relative to the axles 24F, 24R.

Figure 2:
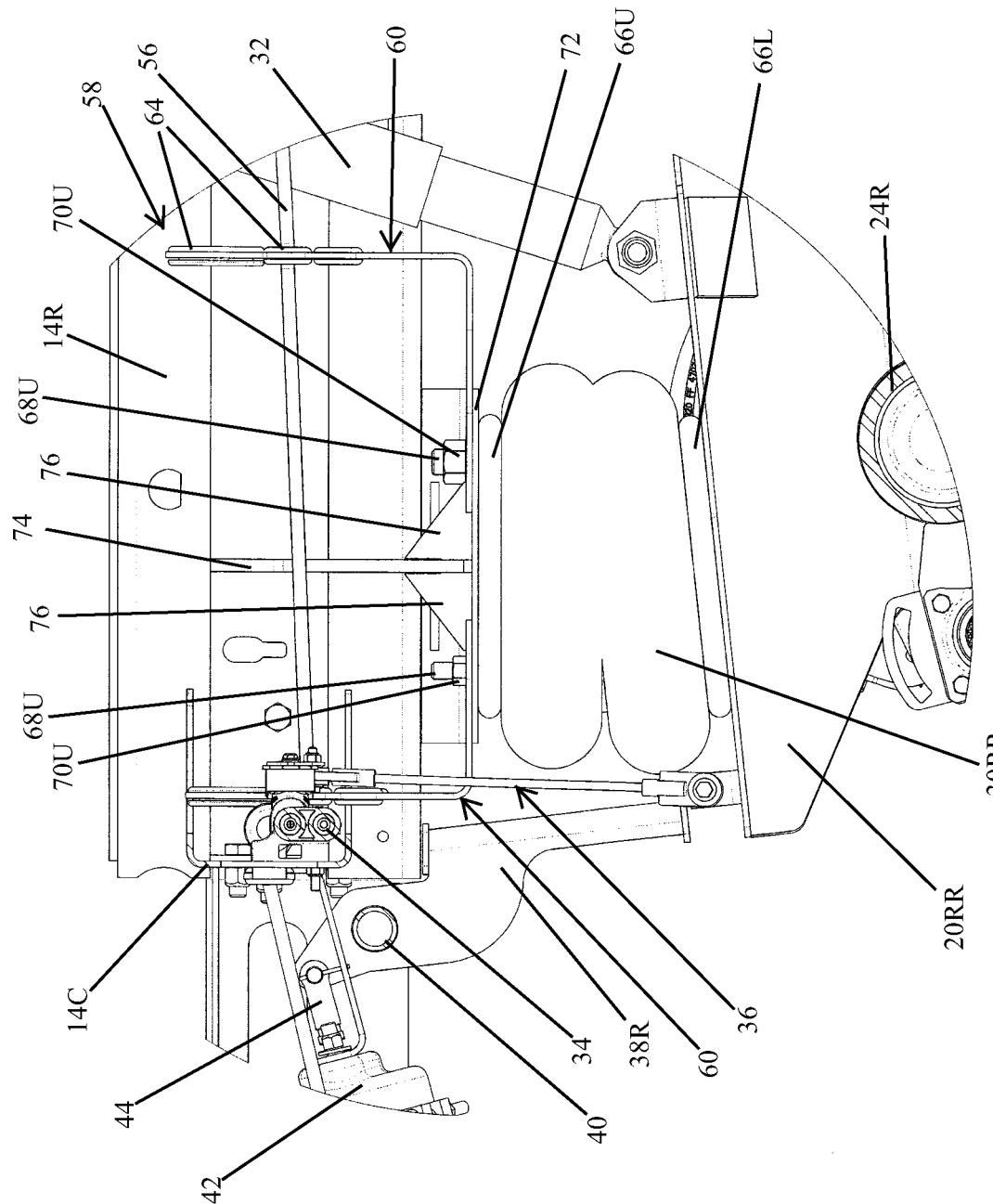
FIG. 2 is a cross sectional view of a portion of the slider suspension taken along line 2-2 of FIG. 1 and showing a pair of supporting brackets of the tubes and wires support system secured with the right rear air spring fasteners.

The height of the frame 12 can be selectively fixed with a pair of blocking arms 38L, 38R which are secured to a shaft 40. Shaft 40 is rotatably mounted on the frame 12. An air spring chamber 42 is mounted on the frame 12 and is coupled to the shaft 40 with a link 44 for thereby selectively simultaneously pivoting blocking arms 38L, 38R between a vertical extended position as shown in FIGS. 1 and 2 and a horizontal retracted position (not shown). In their vertical extended positions, arms 38L, 38R extend between the frame 12 and the respective trailing beams 20LR, 20RR for thereby blocking and limiting the vertical distance between the trailing beams and the frame 12. The height of frame 12 relative to the axles 24F, 24R can thereby be limited/fixed as needed or desired, for example, during loading and unloading.

The slider frame 12 is slidably coupled to a trailer chassis (not shown), in a known and customary manner, with slider rail guides 46 which are secured to the frame left and right side rails 14L, 14R and which are adapted to slidingly receive longitudinally extending lips extending along the trailer chassis. The slider 10 is thereby selectively slidable/adjustable longitudinally along the trailer chassis for selectively locating the slider 10 at a desired longitudinal position along the trailer chassis relative to the distribution of the load being carried by the trailer.

Slider frame 12 is selectively fixed longitudinally along the trailer chassis with locking pins 48 mounted on the frame left and right side rails 14L, 14R and which are selectively retracted from and extended into corresponding holes (not shown) in the trailer chassis. Pins 48 are selectively retracted and extended with a linkage system coupled to a rotatable shaft 50 which is selectively rotated with a crank handle (not shown) coupled to the shaft arm 52. An exemplary slider and a pins locking/releasing system is shown in U.S. Pat. No. 7,163,220, the disclosure of which is incorporated herein by reference.

A coupling plate 54 is provided at the cross brace strap centers 15C and includes holes for receiving the shaft 50 and the cross brace straps 15A, 15B therethough. Coupling plate 54 functions to stabilize and decrease vibrations of the shaft 50 and the cross brace straps 15A, 15B.

A plurality of tubes and wires extend through the slider 10 for providing air and/or electrical power, in a known and customary manner, to the various slider and trailer components such as, for example, the spring brake chambers, the suspension air springs 30LF, 30LR, 30RF, 30RR, the blocking arms air spring chamber 42, the trailer lights, electrical control sensors, etc. The tubes can be made of steel, aluminum, plastic, rubber, etc., and typically carry pressurized air, although they may also carry hydraulic oil and/or other pressurized fluids. The wires are typically insulated electrical conductor wires. Exemplary tubes and wires are shown and designated in the drawings with the numeral 56.

In accordance with the principles of the present invention, a tubes and wires supporting system 58 is provided for supporting the plurality of tubes and wires 56 as they extend through the slider 10. The supporting system 58 includes tubes and wires supporting brackets 60 which are secured to the slider 10 and include one or more supporting holes 62 wherethough the tubes and wires are received and are thereby supported. Supporting brackets 60 are preferably made of steel by stamping or cutting from flat stock and bending to the desired shapes. Plastic or rubber annular shaped grommets 64 are received in and circumscribe the brackets supporting holes 62 for decreasing potential wear and/or damage to the tubes and wires 56 extending therethrough.

Figure 3:
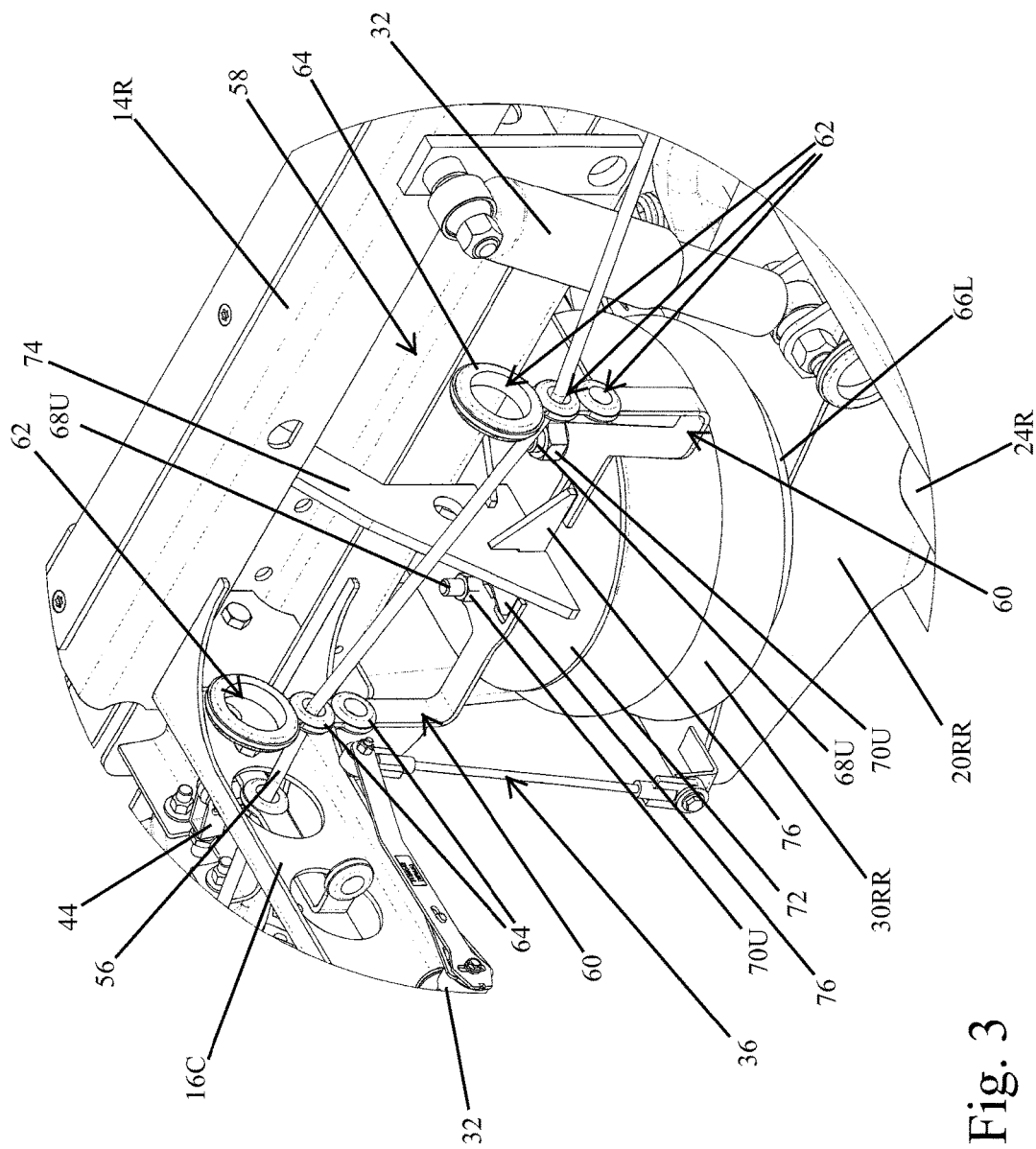
FIG. 3 is a perspective view of the supporting brackets and portion of the slider suspension shown in FIG. 2.
Figure 4:
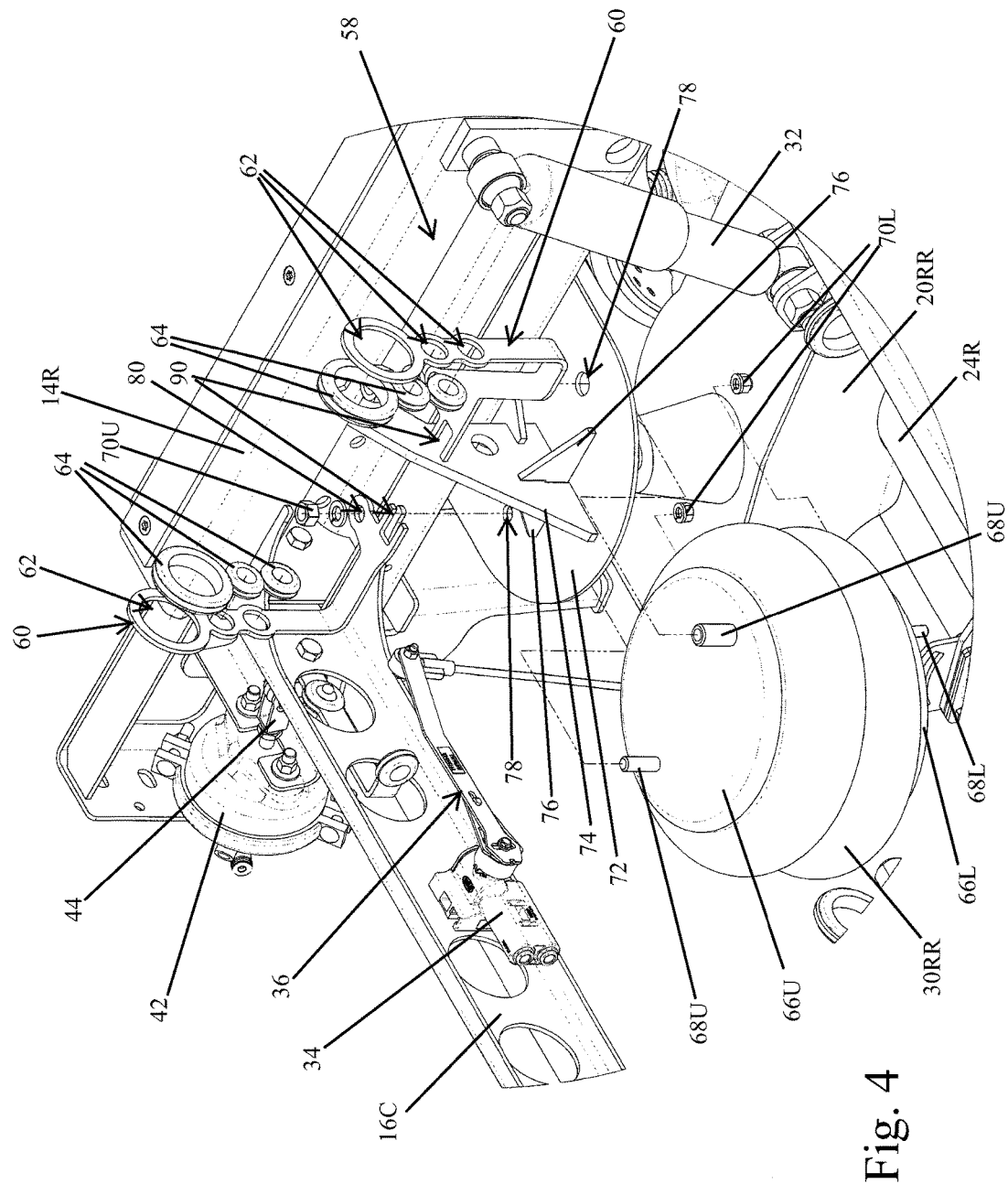
FIG. 4 is an exploded view of the supporting brackets and portion of the slider suspension shown in FIG. 3.
Figure 5:
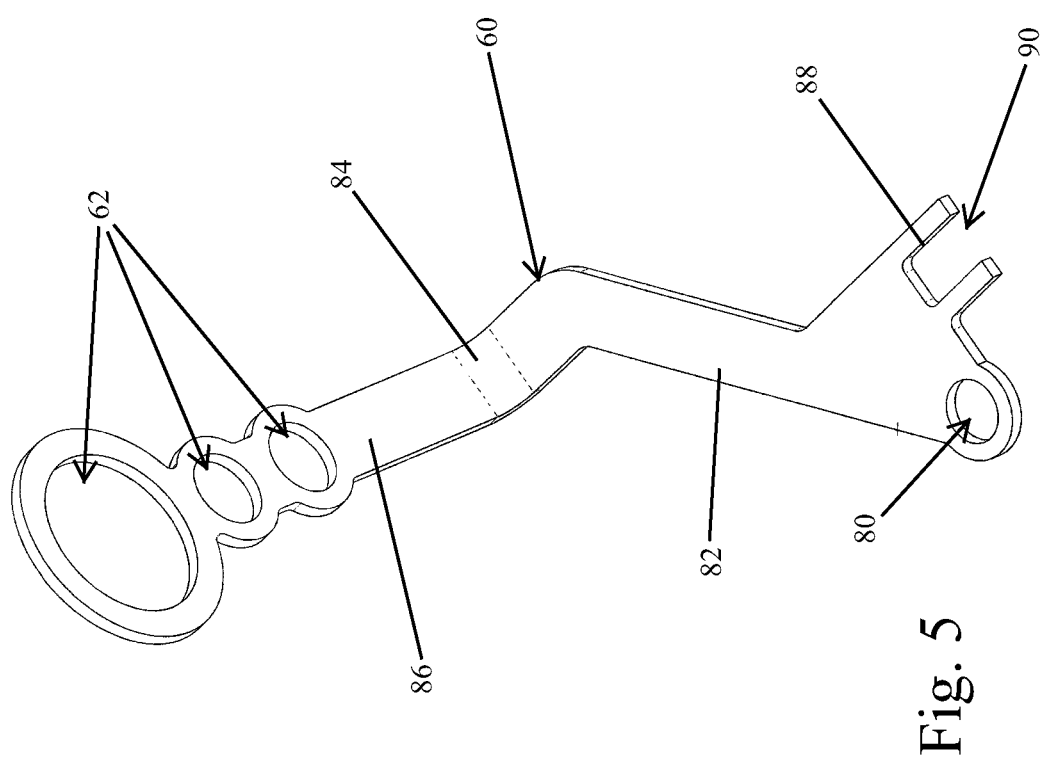
FIG. 5 is a perspective view of one of the supporting brackets shown in FIGS. 2-4.
Figure 6:
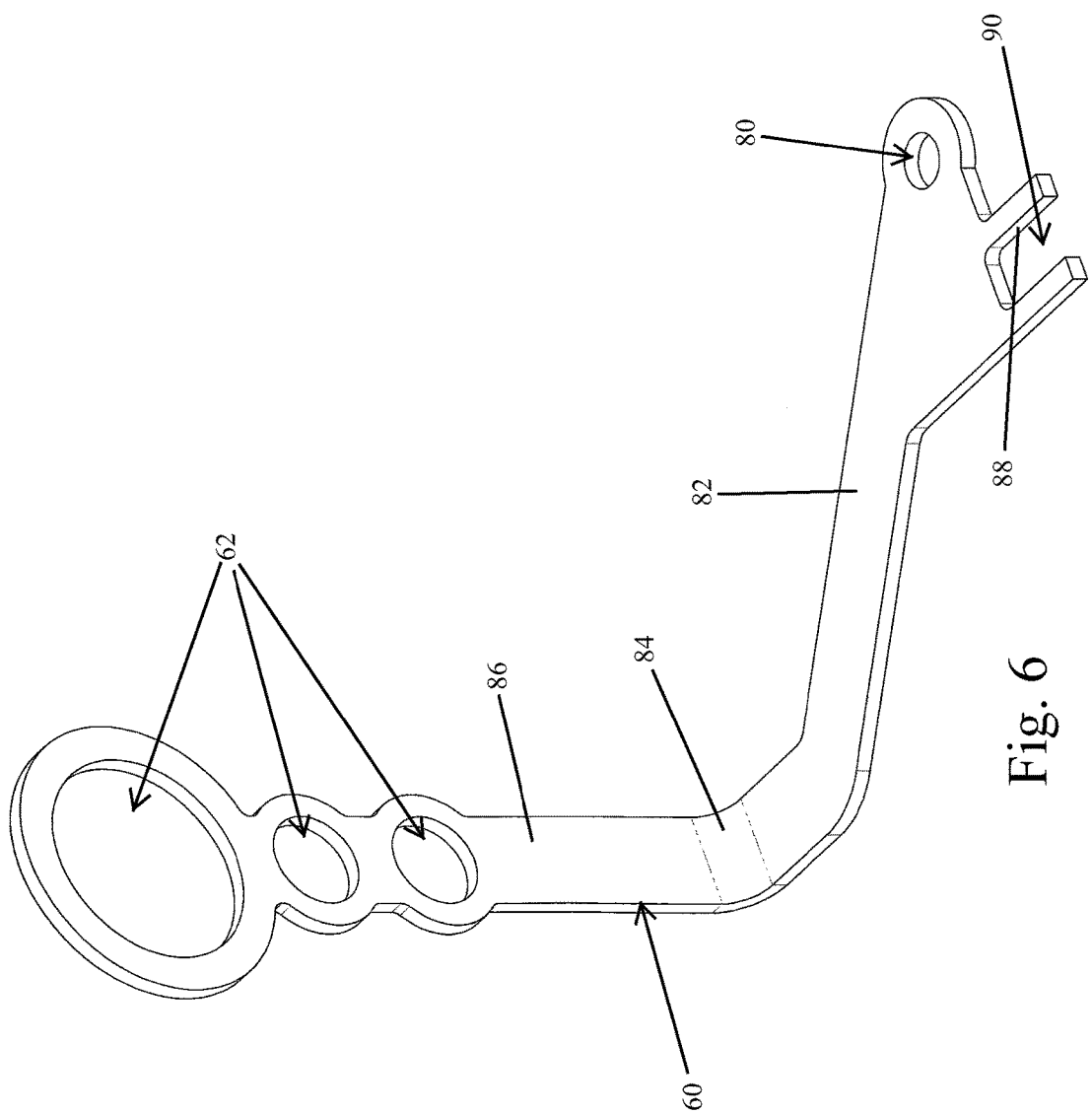
FIG. 6 is a perspective view of another one of the supporting brackets shown in FIGS. 2-4.
Figure 7:
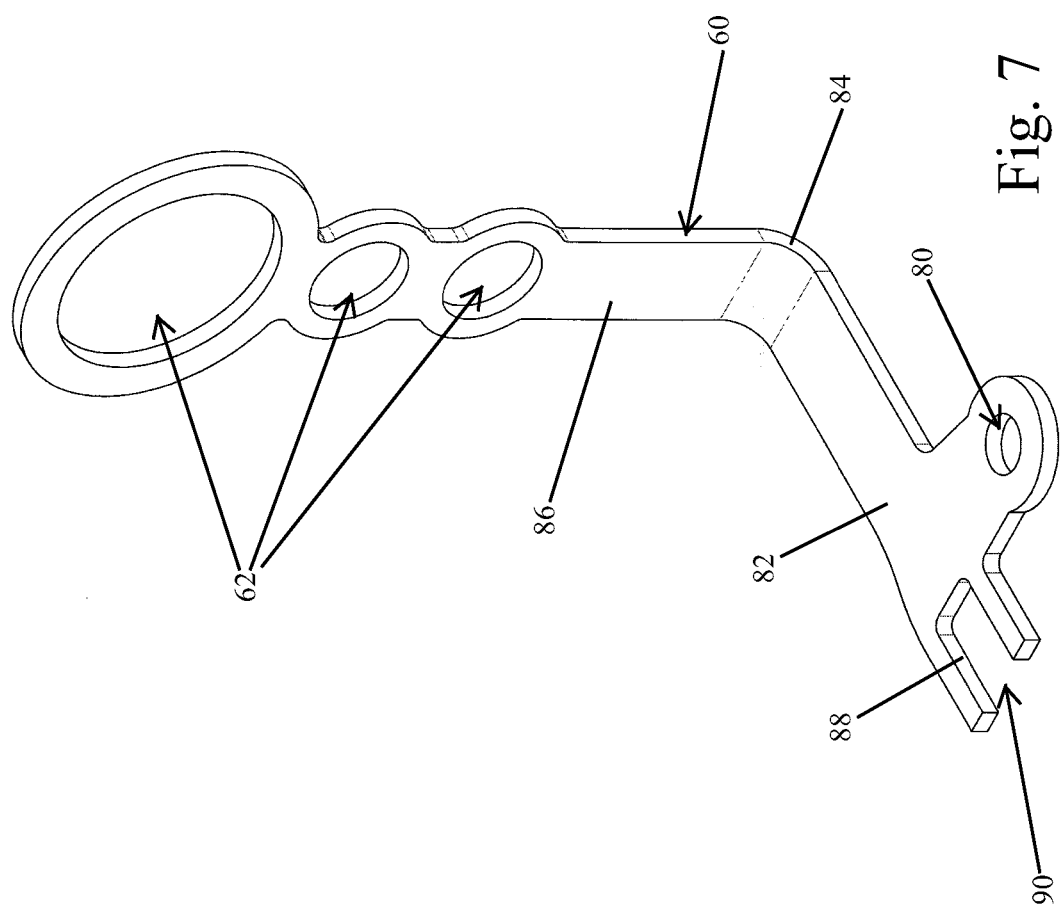
FIG. 7 is an alternate embodiment of a supporting bracket constructed in accordance with the principles of the present invention.
Figure 8:
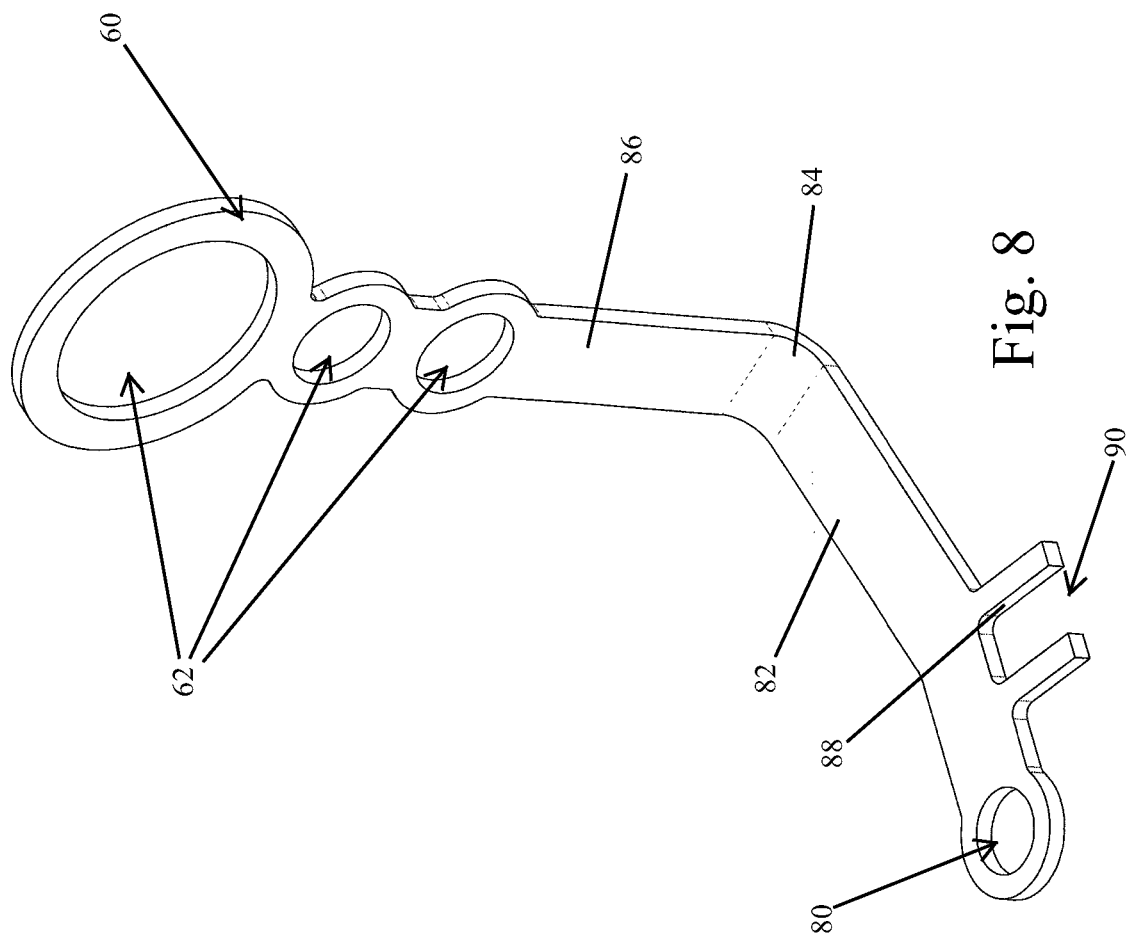
FIG. 8 is another alternate embodiment of a supporting bracket constructed in accordance with the principles of the present invention; and, FIG. 9 is yet another alternate embodiment of a supporting bracket constructed in accordance with the principles of the present invention.

Advantageously, the tubes and wires supporting brackets 60 are secured to the slider 10 with the fastener screws and bolts which are used to secure the air springs 30LF, 30LR, 30RF, 30RR to the slider 10. As best seen in FIGS. 2-4, each of the air springs 30LF, 30LR, 30RF, 30RR include upper and lower bearing plates 66U, 66L which are adhered to the rubber air springs and which include respective threaded fastener screws 68U, 68L extending perpendicular therefrom. The lower bearing plates 66L are secured atop their respective trailing beam 20LF, 20LR, 20RF, 20RR with fasteners 68L and bolts 70L.

The upper bearing plates 66U are located under and abut the frame stop plates 72 which are affixed to the frame side rails 14L, 14R with fasteners and/or welding. Frame stop plates 72 extend along a horizontal plane and extend perpendicularly inboard from the frame side rails 14L, 14R. A main brace 74 extends between the frame stop plates 72 and the respective adjacent side rails 14L, 14R and is rigidly secured thereto, preferably by welding. Main braces 74 extend along a vertical plane which is perpendicular to both the frame stop plates 72 and the side rails 14L, 14R. A pair of side braces 76 extend between the main braces 74 and the frame stop plates 72 and are rigidly secured thereto, also preferably by welding. Side braces 76 extend along a vertical plane which is parallel to the frame side rails 14L, 14R and perpendicular to both the frame stop plates 72 and main brace 74. As should be appreciated, main braces 74 and side braces 76 function to maintain the frame stop plates 72 in their horizontal planes and to transfer the load forces from the air springs 30LF, 30LR, 30RF, 30RR to the side rails 14L, 14R.

Frame stop plates 72 include fastener holes 78 whereby, when the air spring upper bearing plates 66U are located adjacent to and abutting the stop plates 72, the upper fastener screws thereof 68U correspond with and extend through the holes 78 and project vertically above and perpendicular to the stop plates 72. Bolts 70U are threadingly received on the upper fasteners screws 68U for thereby securing the air spring upper plates 66U to their respective frame stop plates 72.

The supporting brackets 60 include securement holes 80 adapted to also receive an air spring upper bearing plate fastener screw 68U therethough. Accordingly, each supporting bracket 60 is secured to the slider 10 by extending an air spring upper bearing plate fastener screw 68U through its securement hole 80 and, by threading the bolts 70U onto the fastener screw 68U, clamping the bracket 60 between the bolt 70U and the frame stop plate 72.

Preferably, the brackets 60 are made by cutting and/or stamping and bending flat steel stock of about 0.179 inch thick, and include a horizontal leg 82 joined at an integral bend 84 to a vertical arm 86. The bracket securement hole 80 is located on the horizontal leg 82 and the plurality of supporting holes 62 are located on the vertical arm 86. The horizontal leg 82 is adapted to lay flat atop of a frame stop plate 72 and extends along a horizontal plane which is parallel to the frame stop plate 72. The horizontal leg 82 also includes a wall 88 adapted to abut a side brace 76 and/or a main brace 74 and thereby prevent potential rotation of the supporting bracket 60 about the fastener screw 68U both during assembly and thereafter. Preferably, the horizontal leg 82 includes a slot or indentation 90 adapted to receive a portion of and abut a side brace 76 or main a brace 74 and thereby prevent rotation of the supporting bracket 60 about the fastener screw 68U.

As will now be evident to one skilled in the art, the location of the wall 88 and/or slot 90 relative to the bracket securement hole 80 and the extension direction of the horizontal leg 82 and height of the vertical arm 86 can be varied for thereby accommodating the locations of the main brace 74 and side braces 76, and for locating the brackets supporting holes 62 in a plane generally perpendicular to the direction of the tubes and wires 56 and at a desired location for receiving therethrough and supporting the tubes and wires 56 along a desirable path and as may be needed.

Figure 9:
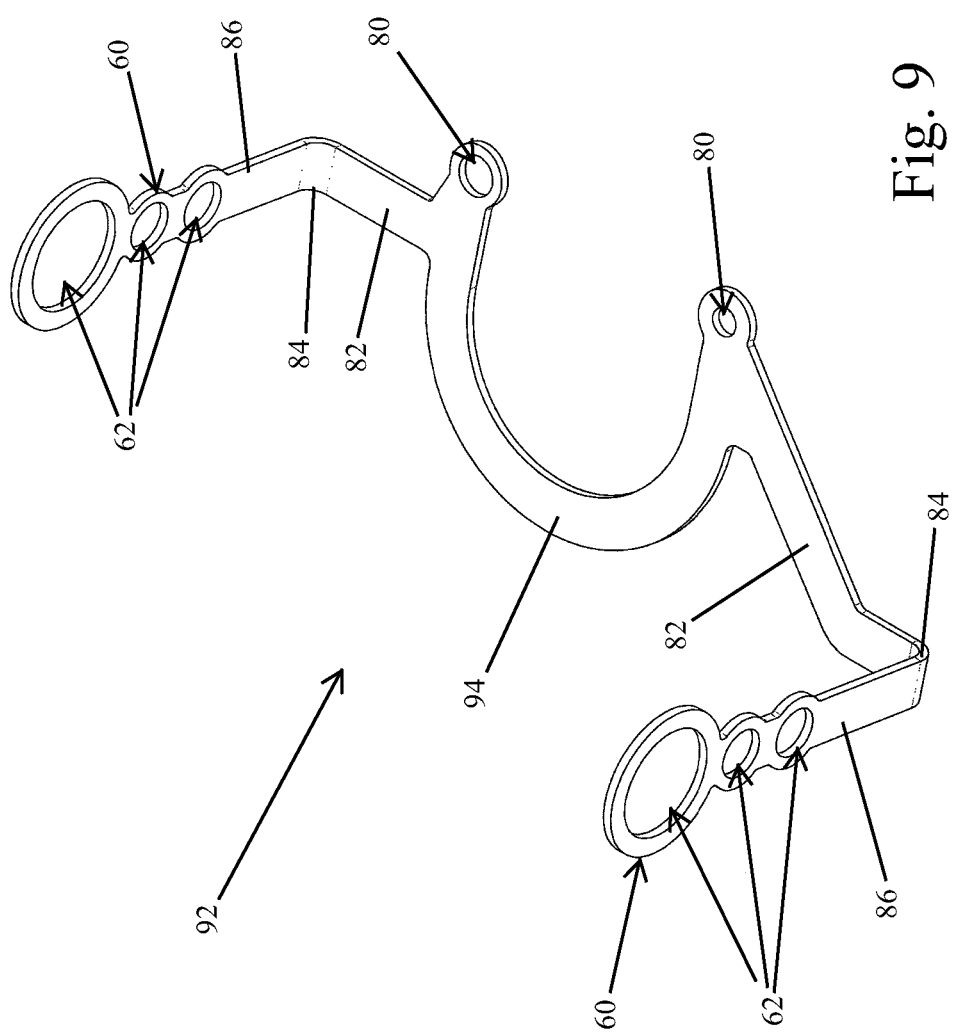

In the embodiment of FIG. 9, a tubes and wires supporting bracket 92 does not include an abutment wall 88 or a slot/indentation 90. Rather, bracket 92 includes a bridge 94 extending between the horizontal legs 82 of adjacent brackets 60 and a pair of securement holes 80 for similarly receiving the air spring upper bearing plate fastener screws 68U therethrough and clamping the brackets 60 between the bolts 70U and the frame stop plate 72. The pair of securement holes 80 in this embodiment together similarly function to prevent rotation of the supporting brackets 60 about either of the fastener screws 68U of the air spring upper bearing plate 66U.

While this invention has been described as having an exemplary design, the present invention may be further modified within the spirit and scope of this disclosure. This application is therefore intended to cover any variations, uses, or adaptations of the invention using its general principles.

What is claimed is:

1. A trailer suspension including a tubes and wires support system comprising:
    a frame adapted to support a trailer;
    an axle pivotally secured to said frame;
    a suspension air spring located between said axle and a stop plate secured to said frame;
    said suspension air spring comprising a bearing plate including a fastener extending therefrom;
    wherein said air spring bearing plate abuts said stop plate with said fastener extending through a hole in said stop plate; and,
    a tubes and wires supporting bracket secured to said frame with said fastener whereby tubes and wires extending along said frame are supported by said bracket.

2. The trailer suspension of claim 1 wherein said supporting bracket includes a supporting hole wherethough said tubes and wires are received and are thereby supported.

3. The trailer suspension of claim 2 further comprising an annular grommet circumscribing said bracket supporting hole wherethough said tubes and wires are received and are thereby supported.

4. The trailer suspension of claim 1 further comprising a brace secured between said stop plate and said frame and wherein said bracket includes a wall abutting said brace.

5. The trailer suspension of claim 1 further comprising a brace secured between said stop plate and said frame and wherein said bracket includes a slot wherein a portion of said brace is received.

6. The trailer suspension of claim 1 further comprising a main brace secured between said stop plate and said frame and a side brace secured between said main brace and said stop plate, and wherein said bracket includes a wall abutting said side brace.

7. The trailer suspension of claim 1 further comprising a main brace secured between said stop plate and said frame and a side brace secured between said main brace and said stop plate, and wherein said bracket includes a slot wherein a portion of said side brace is received.

8. The trailer suspension of claim 1 wherein said bearing plate includes two fasteners extending therefrom and through separate holes in said stop plate and wherein said bracket is secured to said frame with both said two fasteners.

9. The trailer suspension of claim 8 wherein said bracket includes a pair of securement holes and a bridge therebetween and wherein each of said two bearing plate fasteners extend through a respective one of said bracket securement holes.

10. The trailer suspension of claim 1 wherein said bracket includes a securement hole wherethrough said fastener extends and a nut threadingly received on said fastener whereby said bracket is clamped between said nut and said stop plate.

11. The trailer suspension of claim 10 wherein said supporting bracket includes a supporting hole wherethough said tubes and wires are received and are thereby supported.

12. The trailer suspension of claim 11 further comprising a brace secured between said stop plate and said frame and wherein said bracket includes a wall abutting said brace.

13. The trailer suspension of claim 11 further comprising a brace secured between said stop plate and said frame and wherein said bracket includes a slot wherein a portion of said brace is received.

14. The trailer suspension of claim 11 further comprising a main brace secured between said stop plate and said frame and a side brace secured between said main brace and said stop plate, and wherein said bracket includes a slot wherein a portion of said side brace is received.

15. The trailer suspension of claim 1 wherein said frame is slidably coupled to a trailer chassis and is selectively longitudinally slidable along said chassis.

16. The trailer suspension of claim 15 wherein said bracket includes a securement hole wherethrough said fastener extends and a nut threadingly received on said fastener whereby said bracket is clamped between said nut and said stop plate.

17. The trailer suspension of claim 16 wherein said supporting bracket includes a supporting hole wherethough said tubes and wires are received and are thereby supported.

18. The trailer suspension of claim 17 further comprising a brace secured between said stop plate and said frame and wherein said bracket includes a wall abutting said brace.

19. The trailer suspension of claim 17 further comprising a brace secured between said stop plate and said frame and wherein said bracket includes a slot wherein a portion of said brace is received.

20. The trailer suspension of claim 17 further comprising a main brace secured between said stop plate and said frame and a side brace secured between said main brace and said stop plate, and wherein said bracket includes a slot wherein a portion of said side brace is received.

\* \* \* \* \*